(12) United States Patent
Kim et al.

(10) Patent No.: US 11,420,420 B2
(45) Date of Patent: Aug. 23, 2022

(54) COMPOSITE MATERIAL STEEL SHEET (71) Applicant: POSCO, Pohang-si (KR)

(72) Inventors: Jin-Tae Kim, Gwangyang-si (KR);
Myung-Soo Kim, Gwangyang-si (KR);
Jung-Hwan Lee, Gwangyang-si (KR);
Ha-Na Choi, Gwangyang-si (KR)

(73) Assignee: POSCO, Pohang-si (KR)

( * ) Notice: Subject to any disclaimer, the term of this patent is extended or adjusted under 35 U.S.C. 154(b) by 91 days.

(21) Appl. No.: 16/956,248

(22) PCT Filed: Dec. 6, 2018

(86) PCT No.: PCT/KR2018/015360
§ 371 (c)(1),
(2) Date: Jun. 19, 2020

(87) PCT Pub. No.: WO2019/124829
PCT Pub. Date: Jun. 27, 2019

(65) Prior Publication Data
US 2020/0324519 A1 Oct. 15, 2020

(30) Foreign Application Priority Data

Dec. 24, 2017 (KR) .................. 10-2017-0178918

(51) Int. Cl.
*B32B 15/12* (2006.01)
*B32B 5/18* (2006.01)
*B32B 15/04* (2006.01)
*B32B 15/18* (2006.01)
(Continued)

(52) U.S. Cl.
CPC ............. *B32B 15/12* (2013.01); *B32B 5/18* (2013.01); *B32B 15/046* (2013.01); *B32B 15/18* (2013.01); *B32B 25/06* (2013.01); *B32B 29/06* (2013.01); *B32B 2260/028* (2013.01); *B32B 2260/046* (2013.01); *B32B 2266/025* (2013.01);
(Continued)

(58) Field of Classification Search
None
See application file for complete search history.

(56) References Cited

U.S. PATENT DOCUMENTS 3,868,298 A 2/1975 Schrade
5,063,098 A * 11/1991 Niwa ............... E04B 9/045
428/76
5,985,457 A 11/1999 Clifford
(Continued)

FOREIGN PATENT DOCUMENTS

CN 1370113 9/2002
CN 1422209 6/2003
(Continued)

OTHER PUBLICATIONS

Oishi, Hiroshi, Steel Sheet Laminated with Expanded Polyester Resin Sheet, machine translation of JP2009-262434 (Year: 2009).*
(Continued)

*Primary Examiner* — Chinessa T. Golden
(74) *Attorney, Agent, or Firm* — Cantor Colburn LLP (57) ABSTRACT

A composite material steel sheet comprises: at least one steel sheet, and a resin-impregnated paper composite layer, wherein the resin-impregnated paper composite layer may comprise stacked sheets of paper, and impregnated resin provide adhesion between the sheets of paper in contact with each other.

7 Claims, 8 Drawing Sheets

(51) Int. Cl.
   *B32B 25/06*   (2006.01)
   *B32B 29/06*   (2006.01)
(52) U.S. Cl.
   CPC . *B32B 2266/0228* (2013.01); *B32B 2305/022* (2013.01); *B32B 2307/56* (2013.01)

(56) References Cited

U.S. PATENT DOCUMENTS

| | | | |
|---|---|---|---|
| 2002/0086172 | A1* | 7/2002 | Clifford ............... B32B 15/08 428/467 |
| 2003/0129364 | A1 | 7/2003 | Clifford |
| 2004/0175554 | A1 | 9/2004 | Clifford |
| 2007/0110978 | A1 | 5/2007 | Kawaguchi et al. |
| 2014/0178633 | A1 | 6/2014 | Kleinschmidt et al. |
| 2015/0246518 | A1 | 9/2015 | Sugimoto |

FOREIGN PATENT DOCUMENTS

| | | |
|---|---|---|
| CN | 1568255 | 1/2005 |
| CN | 1966262 | 5/2007 |
| CN | 202225494 | 5/2012 |
| CN | 202242167 | 5/2012 |
| CN | 104540675 | 4/2015 |
| CN | 104647823 | 5/2015 |
| JP | H09272167 | 10/1997 |
| JP | H1076586 | 3/1998 |
| JP | H11046876 | 2/1999 |
| JP | H11058601 | 3/1999 |
| JP | 2002512567 | 4/2002 |
| JP | 2007160917 | 6/2007 |
| JP | 2008095289 | 4/2008 |
| JP | 2009262434 | 11/2009 |
| JP | 2009262434 A * | 11/2009 |
| JP | 2014043011 | 3/2014 |
| KR | 20020015726 | 2/2002 |
| KR | 20060064526 | 6/2006 |
| KR | 20140016952 | 2/2014 |
| KR | 101673991 | 11/2016 |
| KR | 20170067940 | 6/2017 |
| WO | 98035114 | 8/1998 |
| WO | 00059719 | 10/2000 |
| WO | 2001012434 | 2/2001 |
| WO | 2001076864 | 10/2001 |

OTHER PUBLICATIONS

European Search Report—European Application No. 18891606.8 dated Jan. 26, 2021, citing US 2004/0175554, U.S. Pat. No. 5,985,457, and US 2015/0246518.
European Search Report—European Application No. 18891606.8 dated May 19, 2021, citing US 2004/0175554, U.S. Pat. No. 5,985,457, US 2015/0246518, U.S. Pat. No. 5,063,098, and U.S. Pat. No. 3,868,298.
International Search Report—PCT/KR2018/015360 dated Mar. 8, 2019.
Chinese Office Action—Chinese Application No. 201880083553.4 dated Sep. 1, 2021, citing CN 1370113, JP 2009-262434, U.S. Pat. No. 5,063,098, CN 1422209, CN 1568255, CN 104647823, CN 202225494, CN 202242167, CN 104540675, CN 1966262, JP H09-272167, and JP 2008-095289.

* cited by examiner

COMPOSITE MATERIAL STEEL SHEET

TECHNICAL FIELD

The present invention relates to a composite material steel sheet, more specifically to a composite material steel sheet having excellent shock attenuating and vibration damping characteristics.

BACKGROUND ART

Structures or materials with excellent shock attenuating and vibration damping characteristics are materials which have been studied for a long period of time in the fields of automobiles, munitions, home appliances and construction. Recently, there has been increasing demand for materials securing safety in car accidents, materials capable of effectively protecting electronic devices vulnerable to impacts and those capable of preventing the spread of noise between floors or living noise, due to rapid supply of automobiles, high performance of electronic products and a rapid increase in population density in certain regions.

As a method for securing the shock attenuating and vibration damping characteristics of the structure or material, a thickness or volume thereof may be increased; however, this may not be an economically appropriate solution due to an inevitable increase in weight. Accordingly, there is an urgent need for a structure or material for effectively securing the shock attenuating and vibration damping characteristics as well as lightweight.

(Patent Document 1) Korean Laid-Open Publication Application No. 10-2017-0067940 (Publication Date: Jun. 19, 2017)

DISCLOSURE

Technical Problem

An aspect of the present invention is to provide a composite material steel sheet having excellent shock attenuating and vibration damping characteristics.

The technical problem of the present invention is not limited to the problem mentioned above, and other problems not mentioned herein will be clearly understood by those skilled in the art from the following description.

Technical Solution

According to an aspect of the present invention, a composite material steel sheet may include at least one steel sheet and a paper-resin-impregnated composite layer, wherein the paper-resin-impregnated composite layer comprises stacked sheets of paper and a resin impregnated therein to provide adhesion to the paper in contact with each other.

The impregnated resin may be any one of an epoxy resin and a phenol resin, or a mixture thereof.

The paper-resin-impregnated composite layer may have a thickness of 10 μm to 1000 μm.

The composite material steel sheet may further include a porous foam layer.

A pore formed in the porous foam layer may have an average diameter of 1 μm to 10 μm.

The pore formed in the porous foam layer may be closed cells.

The porous foam layer may be formed by any one of a polyethylene (PE) foam, a polystyrene (PS) foam and an ethyl-vinyl acetate (EVA) foam.

The porous foam layer may have a thickness of 100 μm to 1000 μm.

The composite material steel sheet may further include an elastomer layer providing cushioning against physical impacts and vibrations.

The elastomer layer may be anyone of a urethane rubber, a silicone rubber, a butadiene rubber, an ethylene-propylene synthetic rubber and a natural rubber, or a mixture of any one or more thereof.

According to another aspect of the present invention, a composite material steel sheet may include a first steel sheet; a second steel sheet; and a paper-resin-impregnated composite layer inserted between the first and second steel sheets and comprising stacked sheets of paper with an impregnated resin.

The composite material steel sheet may further include a porous foam layer inserted between the first and second steel sheets and having one surface closely in contact with one side of the paper-resin-impregnated composite layer.

The composite material steel sheet may further include an elastomer layer inserted between the first and second steel sheets to provide cushioning against physical impacts and vibrations and having one surface closely in contact with one side of the paper-resin-impregnated composite layer.

Advantageous Effects

According to an aspect of the present invention, a composite material steel sheet is provided with a paper-resin-impregnated composite layer formed by impregnating sheets of paper with an impregnated resin, thereby effectively securing rigidity and lightweightedness of the composite material steel sheet as well as effectively dispersing physical impacts and vibrations applied thereto.

Further, a composite material steel sheet according to an aspect further includes a porous foam layer, thereby effectively securing lightweight as well as effectively suppressing spread of physical impacts and vibrations applied thereto.

In addition, according to an aspect, a composite material steel sheet further comprises an elastomer layer, thereby effectively securing rigidity as well as effectively absorbing and cushioning the physical impacts and vibrations applied thereto.

BEST MODE

The present invention relates to a composite material steel sheet. Hereinafter, preferred embodiments are described.

The embodiments should not be construed as being limited to the embodiments described below and should be understood as being provided to describe the present invention in more detail.

Figure 1:
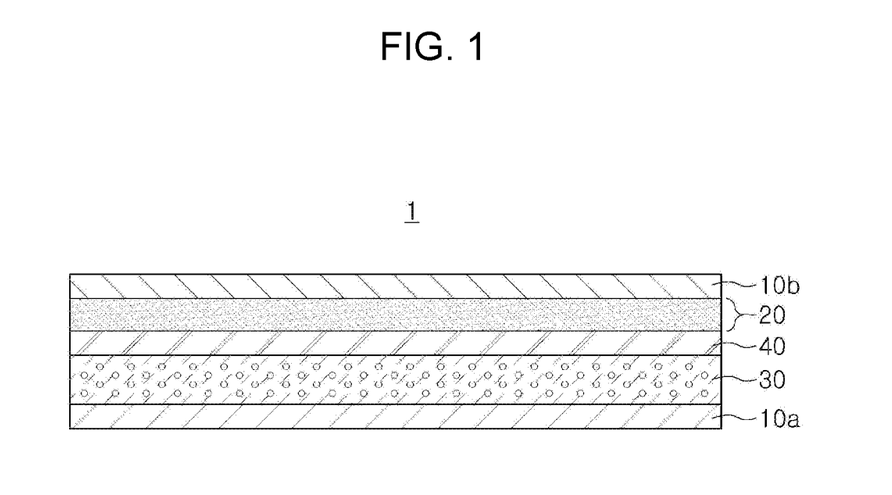
FIG. 1 is a diagram schematically illustrating a cross-section of a composite material steel sheet according to an aspect of the present invention.

FIG. 1 is a diagram schematically illustrating a cross-section of a composite material steel sheet according to an aspect of the present invention.

As illustrated in FIG. 1, a composite material steel sheet 1 according to an aspect of the present invention may include at least one steel sheet 10a and 10b and a paper-resin-impregnated composite layer 20. Further, the composite material steel 1 may further include any one of a porous foam layer 30 and an elastomer layer 40. Types of the steel sheets 10a and 10b of the present invention are not particularly limited and may include various steel sheets such as a cold-rolled steel sheet, a hot-rolled steel sheet, an alloy plating steel sheet, or the like.

Figure 2:
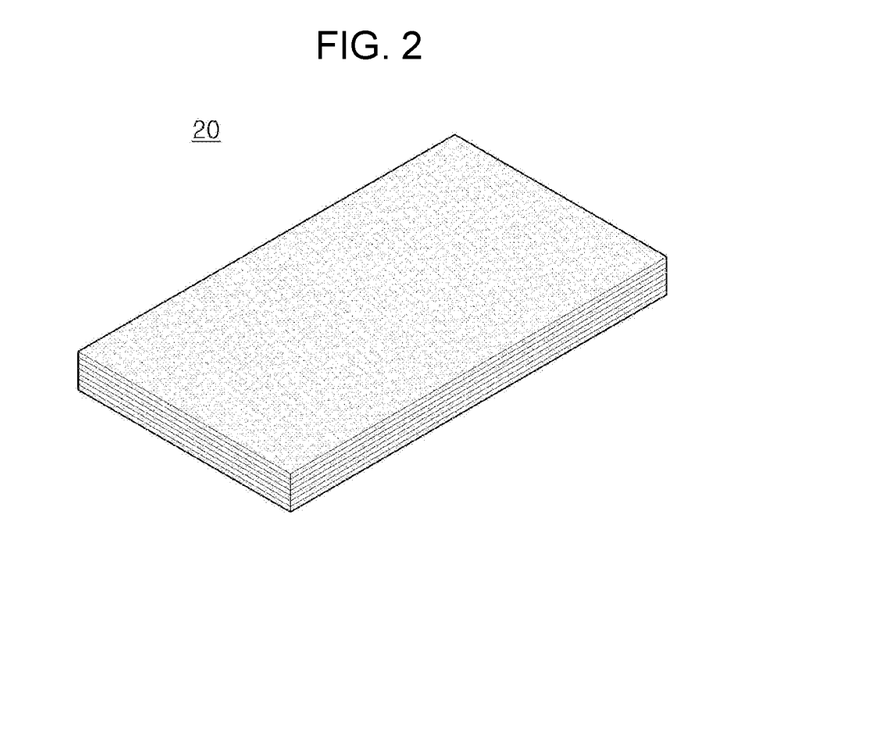
FIG. 2 is a perspective view schematically illustrating a paper-resin-impregnated composite layer of the present invention.
Figure 3:
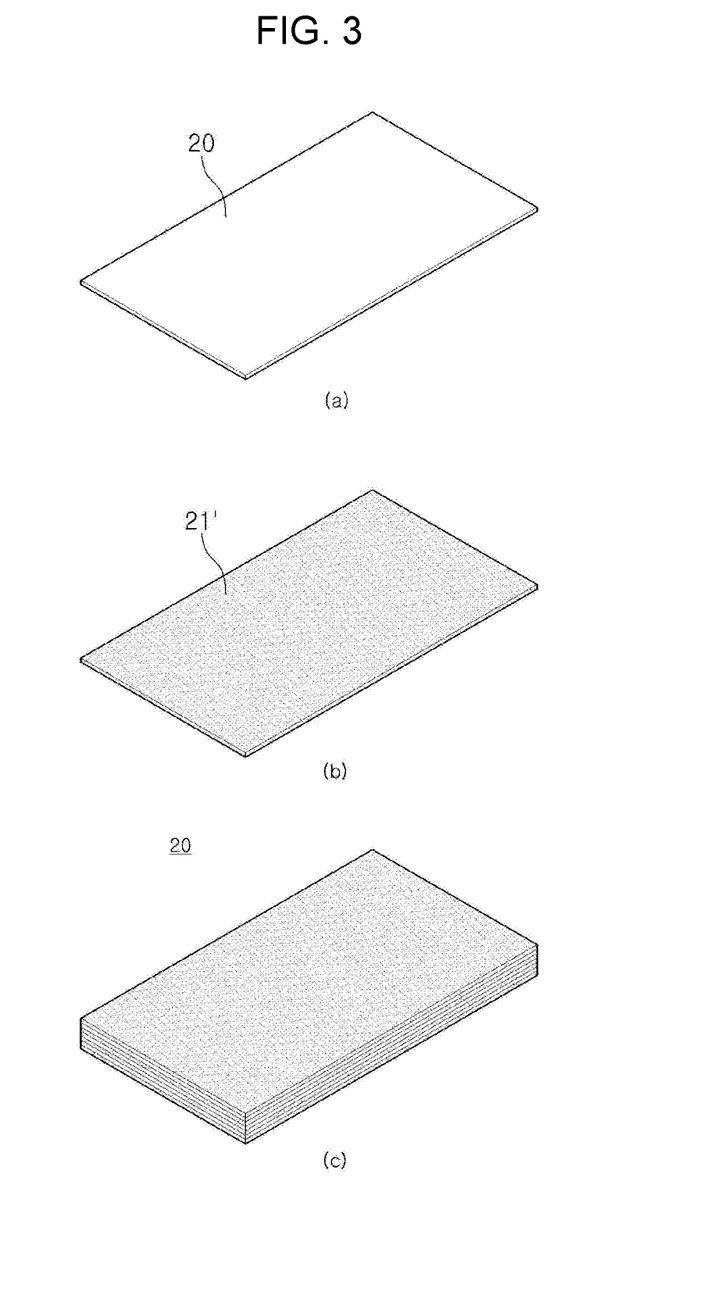
FIGS. 3 and 4 are diagrams schematically illustrating an example of a manufacturing method of a paper-resin-impregnated composite layer of the present invention.
Figure 4:
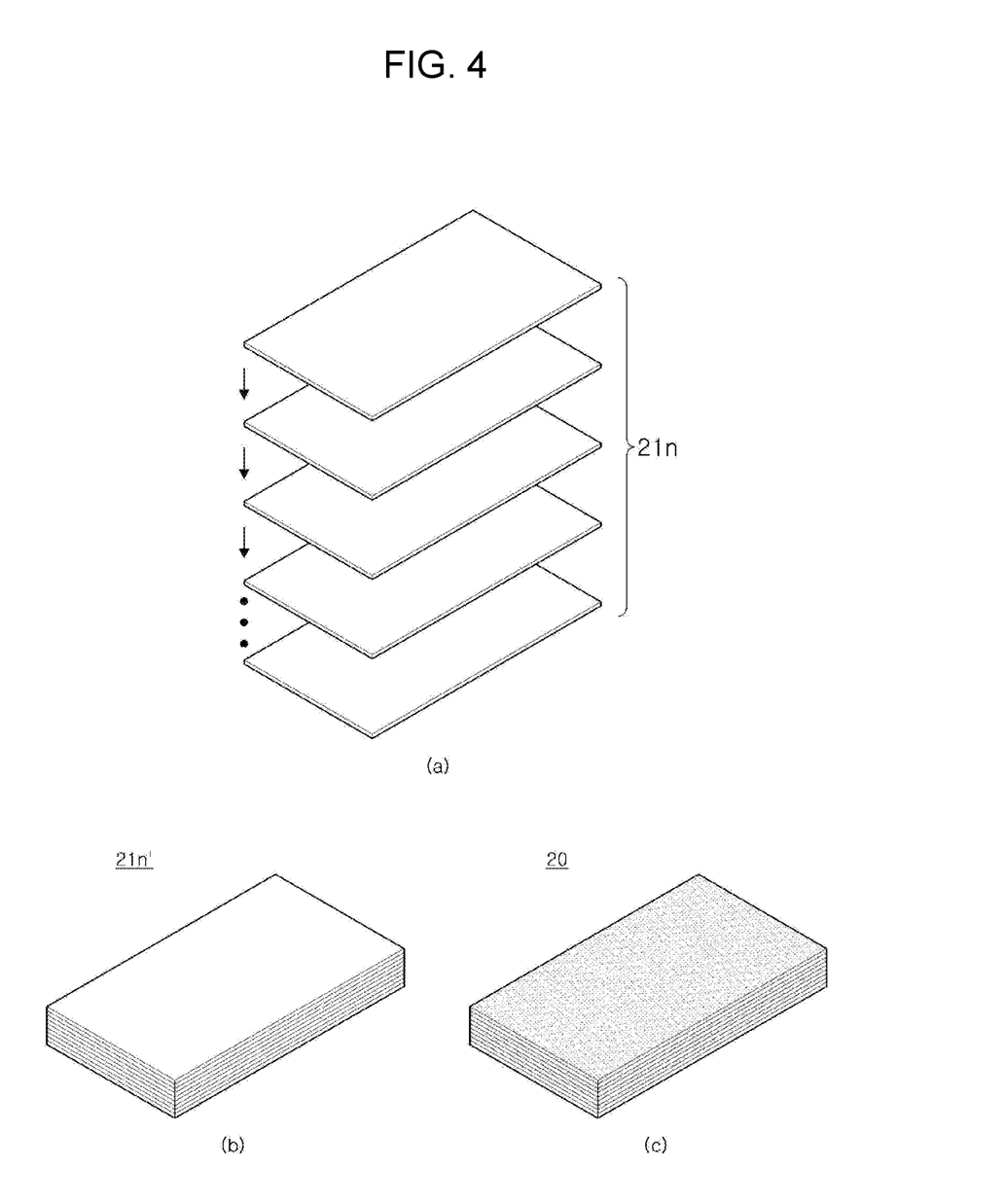

FIG. 2 is a perspective view schematically illustrating a paper-resin-impregnated composite layer of the present invention, while FIGS. 3 and 4 are diagrams schematically illustrating an example of a manufacturing method of a paper-resin-impregnated composite layer of the present invention.

As illustrated in FIG. 2, the paper-resin-impregnated composite layer 20 may include sheets of paper 21 and a resin impregnated in each of the sheets of paper 21 to provide adhesion between stacked sheets of paper 21. The impregnated resin is easily impregnated in paper 21, and a material cured to have appropriate hardness and rigidity after the paper-resin-impregnated composite layer 20 is manufactured is preferable. In particular, the impregnated resin of the present invention may be any one selected from an epoxy resin and a phenol resin, or a mixture thereof.

A thickness and a number of the sheets of paper 21 used in manufacturing of the paper-resin-impregnated composite layer 20 are not particularly limited. A number of the sheets of paper 21 may be determined depending on a thickness of the paper-resin-impregnated composite layer 20 and that of the paper 21. In terms of effective dispersion of an impact and vibration, a thinner paper 21 is more preferable. In the meantime, the thickness and number of the sheets of paper 21 used in the manufacturing of the paper-resin-impregnated composite layer 20 may be determined to be at an appropriate level in consideration of factors such as application fields, manufacturing costs, and the like, of the composite material steel sheet 1 and the thickness of the paper-resin-impregnated composite layer 20.

As illustrated in FIG. 3, the paper-resin-impregnated composite layer 20 may be provided by impregnating each sheet of paper 21 with an impregnated resin and stacking sheets of paper 21' impregnated with the impregnated resin. That is, the paper-resin-impregnated composite layer 20 may be provided by preparing a sheet of paper 21 as illustrated in FIG. 3A, and impregnating the sheet of paper 21 with the impregnating resin as illustrated in FIG. 3B followed by stacking and curing a sheet of paper 21' impregnated with the impregnated resin as illustrated in FIG. 3C.

As illustrated in FIG. 4, the paper-resin-impregnated composite layer 20 may be provided by stacking a plurality of sheets of paper 21n and impregnating an impregnated resin at once. That is, a plurality of the sheets of paper 21n are prepared to satisfy a target height as illustrated in FIG. 4A, and stacking a plurality of the sheets of paper 21n to form a paper stack 21n' as illustrated in FIG. 4B followed by impregnating the paper stack 21n' with an impregnated resin and curing the same as illustrated in FIG. 4C, thereby providing the paper-resin-impregnated composite layer 20. A method for impregnating the impregnated resin in the paper stack 21n' is not particularly limited, but may be immersing the paper stack 21n' in an impregnated resin, applying the impregnated resin to the paper stack 21n', or the like.

The paper-resin-impregnated composite layer 20 may be closely disposed on one side surface of the steel sheets 10a and 10b by adhesion due to an adhesive or additional heat treatment after curing. Alternately, the paper-resin-impregnated composite layer 20 may be attached or compressed on one side surface of the steel sheets 10a and 10b before completion of curing of the impregnated resin or closely disposed on one side surface of the steel sheets 10a and 10b by adhesion of the impregnated resin.

A thickness of the paper-resin-impregnated composite layer 20 may appropriately vary depending on the types of the steel sheets 10a and 10b included in the composite material steel sheet 1 and an application field of the composite material steel sheet 1. A thickness of the paper-resin-impregnated composite layer 20 may be 10 μm to 1000 μm.

As the paper-resin-impregnated composite layer 20 of the present invention includes a plurality of the stacked sheets of paper 21 and a resin impregnated therein 21 to provide adhesion, the paper-resin-impregnated composite layer 20 can effectively disperse physical impacts and vibrations due to the stacked structure, and provide excellent rigidity compared to a weight thereof. Accordingly, the composite material steel sheet 1 according to an aspect of the present invention includes the paper-resin-impregnated composite layer 20 and thus can effectively disperse physical impacts and vibrations applied thereto while effectively achieving lightweight thereof.

Figure 5:
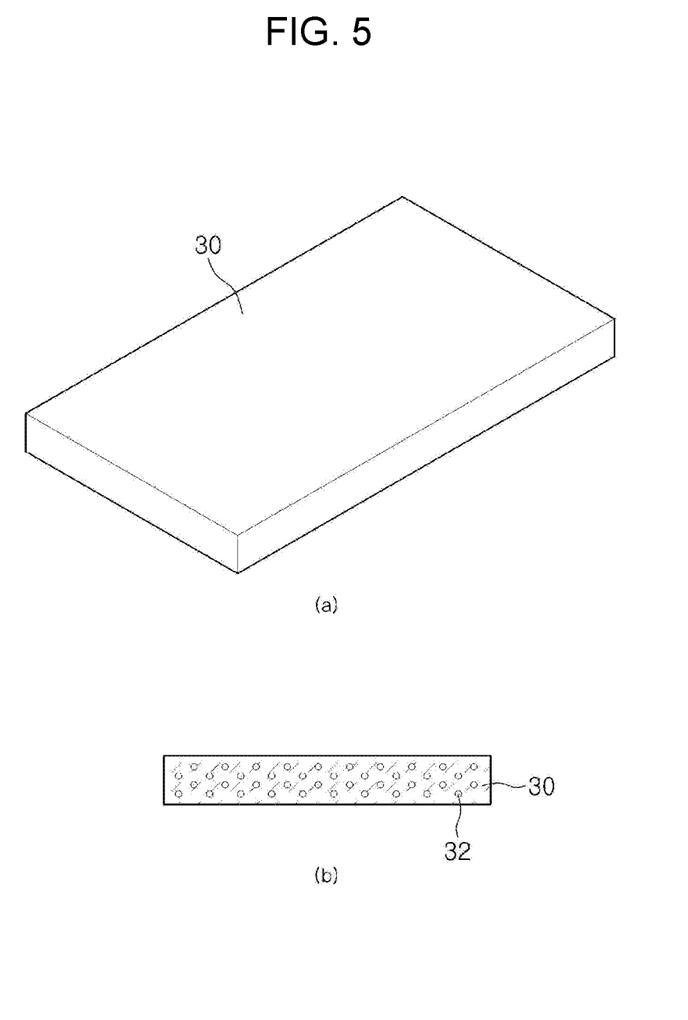
FIG. 5 is (A) a perspective view and (B) a cross-sectional view schematically illustrating a porous foam layer of the present invention.

FIG. 5 is (A) a perspective view and (B) a cross-sectional view schematically illustrating a porous foam layer of the present invention.

As illustrated in FIGS. 5A and 5B, the porous foam layer 30 of the present invention may have several pores 32 formed therein. Preferably, the pores formed in the porous foam layer 30 may be closed cells. That is, as illustrated in FIG. 5B, the pores 32 formed in the porous foam layer 30 may be formed in the closed type disconnecting each other. Further, as illustrated in FIG. 5A, curing of a composition forming the porous foam layer 30 is appropriately controlled or additional heat treatment is performed to provide all pores 32 on a surface of the porous foam layer 30 may be formed in the closed type. The porous foam layer 30 of the present invention is provided in a porous form in which several pores 32 are formed, thereby effectively suppressing spread of physical impacts and vibrations through the composite material steel sheet 1. In addition, the pores 32 formed in the porous foam layer 30 are provided in the form of closed cells, thereby significantly increasing suppression of the spread of physical impacts and vibrations.

The pore 32 formed in the porous foam layer 30 may have an average diameter of 1 μm to 10 μm. A porosity of the porous foam layer 30 may account for 50% or more of a volume of an entire porous foam layer 30. A thickness of the porous foam layer 30 may vary depending on the thickness of the composite material steel sheet 1 and the application field thereof; however, a preferable thickness of the porous foam layer 30 may be 100 μm to 1000 μm.

The composition forming the porous foaming layer 30 of the present invention may be appropriately selected in consideration of factors such as rigidity of the porous foaming layer 30, pore formability during composition formation, workability of the porous foaming layer 30 after curing, and the like, and may be preferably any one of a polyethylene (PE) foam, a polystyrene (PS) foam and an ethyl-vinyl acetate (EVA) foam.

Accordingly, the composite material steel sheet 1 according to an aspect of the present invention includes a comparatively lightweight-structured porous foam layer 30 and can thus effectively suppress spread of physical impacts and vibrations inside the composite material steel sheet 1 while effectively facilitating weight-reduction thereof.

The elastomer layer 40 of the present invention may be any one of a urethane rubber, a silicone rubber, a butadiene rubber, an ethylene-propylene synthetic rubber and a natural rubber, or a mixture of any one or more thereof. The mentioned rubbers have rigidity of a certain level or higher while providing elasticity of a certain level or higher and can thus cushion physical impacts and vibrations applied to the composite material steel sheet 1 to reach a certain level or less. Further, the elastomer layer 40 is a material having lowest rigidity, among the steel sheets 10a and 10b, the paper-resin-impregnated composite layer 20 and the porous foam layer 30, and is thus advantageous in securing rigidity as disposed toward a center portion of the composite material steel sheet 1. However, the elastomer layer 40 is not necessarily disposed in the center portion of the composite material steel sheet 1. If necessary, the elastomer layer 40 may be disposed on an outer side of the composite material steel sheet 1.

The composite material steel sheet 1 includes the elastomer layer 40 and can thus effectively cushion physical impacts and vibrations applied thereto.

Accordingly, the composite material steel sheet 1 according to an aspect includes one or more steel sheets 10a and 10b and the paper-resin-impregnated composite layer 20 and can thus secure a certain level of rigidity and lightweightness of the composite material steel sheet 1 while effectively dispersing physical impacts and vibrations applied to the composite material steel sheet 1. In addition, the composite material steel sheet 1 further includes any one of the porous foam layer 30 and the elastomer layer 40 and can thus secure a certain level of rigidity and lightweightness of the composite material steel sheet 1 while effectively suppressing spread of physical impacts and vibrations.

MODE FOR INVENTION

FIGS. 6 to 9 are cross-sectional views schematically illustrating a composite material steel sheet according to an aspect of the present invention and various modified examples thereof.

Figure 6:
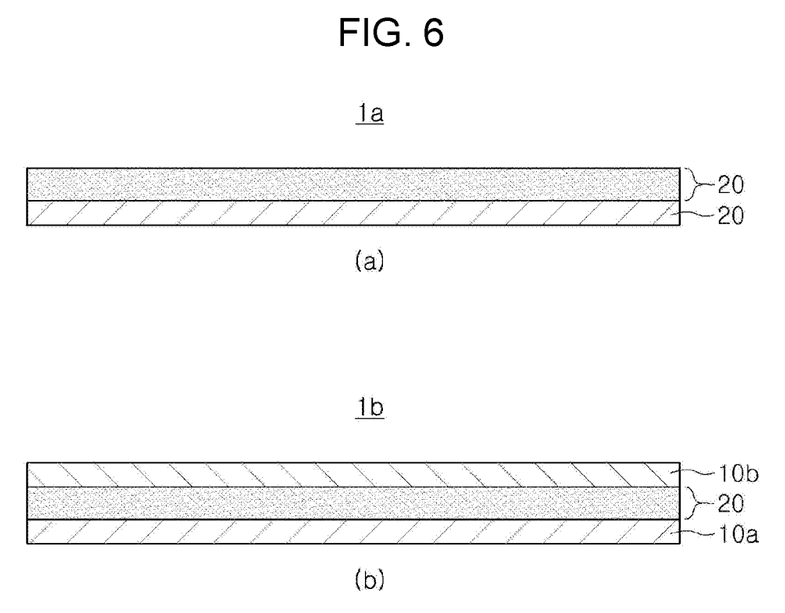
FIGS. 6 to 9 are cross-sectional views schematically illustrating a composite material steel sheet according to an aspect of the present invention and various modified examples thereof.

As illustrated in FIGS. 6A and 6B, a composite material steel sheet 1 according to an aspect of the present invention is provided with a paper-resin-impregnated composite layer 20 on a single steel sheet 10 or between two steel sheets 10a and 10b.

Figure 7:
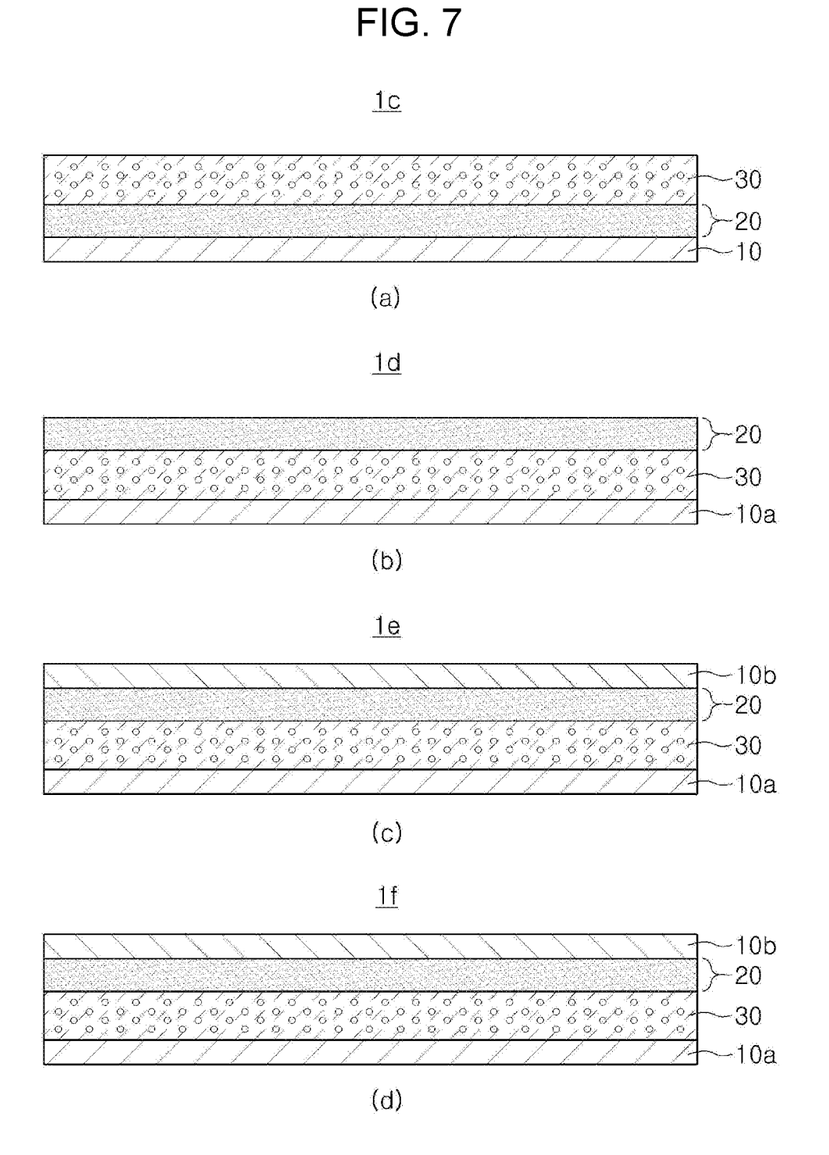
Figure 8:
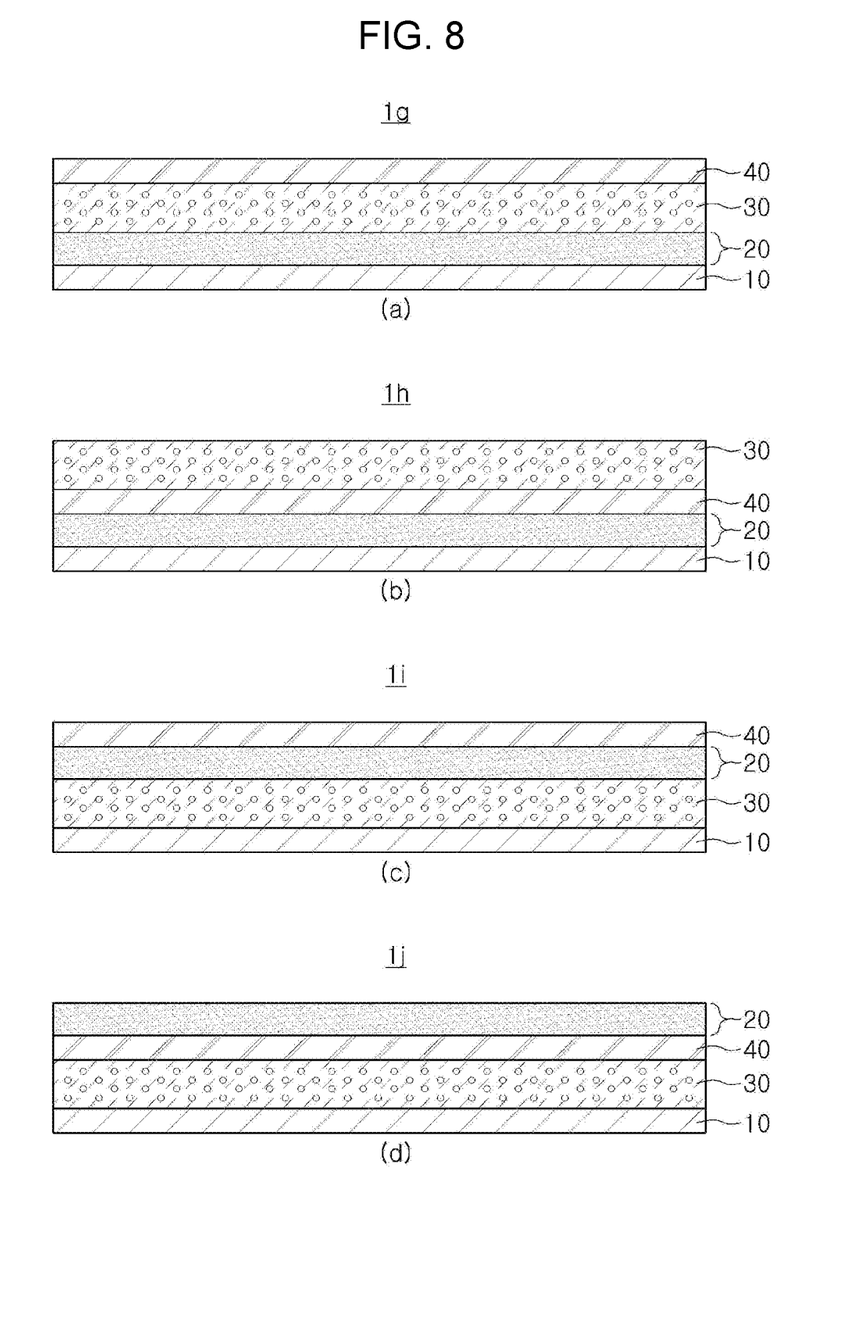

As illustrated in FIGS. 7A and 7B, a composite material steel sheet 1 according to an aspect may be provided with a paper-resin-impregnated composite layer 20 and a porous foam layer 30 stacked on a single steel sheet 10 in order or a paper porous foam layer 30 and a resin-impregnated composite layer 20 stacked on a single steel sheet 10 in order. Alternatively, as illustrated in FIGS. 7C and 7D, a composite material steel sheet 1 according to an aspect may be provided with a paper-resin-impregnated composite layer 20, a porous foam layer 30 and a second steel sheet 10b stacked on a first steel sheet 10a in order or a porous foam layer 30 and a paper-resin-impregnated composite layer 20 and a second steel sheet 10b stacked on a first steel sheet 10a in order.

Although not illustrated in FIG. 7, a composite material steel sheet 1 of the present invention may be provided with a paper-resin-impregnated composite layer 20 and an elastomer layer 40 on a single steel sheet while varying a combination order thereof. Alternately, a composite material steel sheet 1 of the present invention may be provided with a porous foam layer 30 and an elastomer layer 40 between two steel sheets 10a and 10b while varying a combination order thereof.

Figure 9:
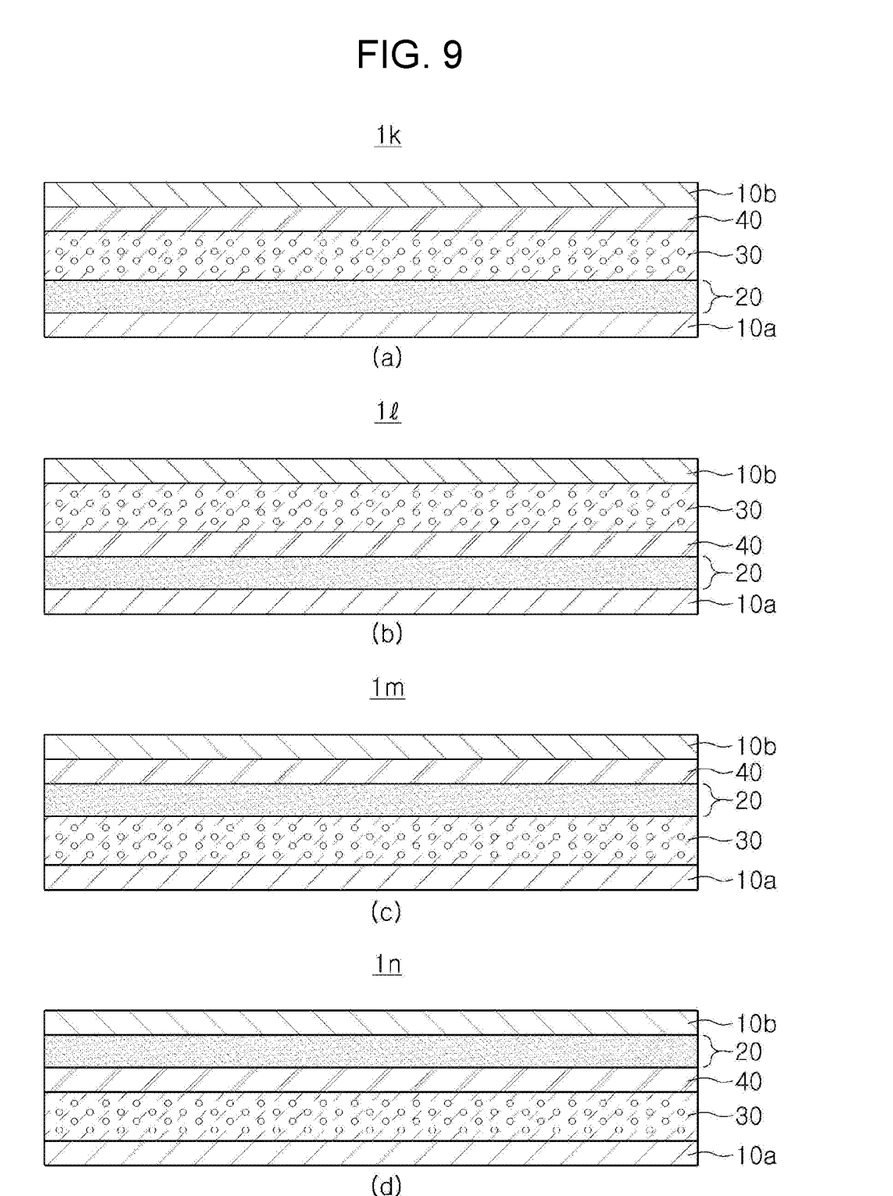

As illustrated in FIGS. 8A to 8D, a composite material steel sheet 1 according to an aspect may be provided with a paper-resin-impregnated composite layer 20, a porous foam layer 30 and an elastomer layer 40 on a single steel sheet 10 while varying a combination order thereof. Alternately, as illustrated in FIGS. 9A to 9D, a composite material steel sheet according to an aspect may be provided with a paper-resin-impregnated composite layer 20, a porous foam layer 30 and an elastomer layer 40 between two steel sheets 10a and 10b while varying a combination order thereof.

Furthermore, a composite material steel sheet 1 of the present invention may be provided with two or more steel sheets 10 and any of at least one of a paper-resin-impregnated composite layer 20, a porous foam layer 30 and an elastomer layer 40 appropriately disposed between the steel sheets 10.

A composite material steel sheet 1 according to an aspect of the present invention may be appropriately provided with one or more of a resin-impregnated composite layer 20, a porous foam layer 30 and an elastomer layer 40 on a single steel sheet 10 or appropriately provided with two or more steel sheets 10 and one or more of a resin-impregnated composite layer 20, a porous foam layer 30 and an elastomer layer 40 on a single steel sheet 10. Characteristics relevant to rigidity, a thickness, a physical impact, vibration, and the like, of the composite material steel sheet 1 may be appropriately selected and applied depending on application fields and targets thereof.

Although described in detail with reference to the above example embodiments, the present invention may be embodied in many different forms. Therefore, the technical concept and scope of the claims set forth below are not limited to the example embodiments.

The invention claimed is:

1. A composite material steel sheet, comprising:
   a first steel sheet;
   a second steel sheet;
   a paper-resin-impregnated composite layer inserted between the first steel sheet and the second steel sheet and comprising stacked sheets of paper with an impregnated resin;
   a porous foam layer inserted between the first steel sheet and the paper-resin-impregnated composite layer, where pore formed in the porous foam layer is a closed cell of an average diameter of 1 µm to 10 µm; and
   an elastomer layer inserted between the second steel sheet and the paper-resin-impregnated composite layer, providing cushioning against physical impacts and vibrations.

2. The composite material steel sheet of claim 1, wherein the impregnated resin is any one of an epoxy resin and a phenol resin, or a mixture thereof.

3. The composite material steel sheet of claim 1, wherein the paper-resin-impregnated composite layer has a thickness of 10 µm to 1000 µm.

4. The composite material steel sheet of claim 1, wherein the porous foam layer has a porosity of 50% or more.

5. The composite material steel sheet of claim 1, wherein the porous foam layer is formed of any one of a polyethylene (PE) foam, a polystyrene (PS) foam and an ethyl-vinyl acetate (EVA) foam.

6. The composite material steel sheet of claim 1, wherein the porous foam layer has a thickness of 100 μm to 1000 μm.

7. The composite material steel sheet of claim 1, wherein the elastomer layer is formed of any one of a urethane rubber, a silicone rubber, a butadiene rubber, an ethylene-propylene synthetic rubber and a natural rubber, or a mixture of any one or more thereof.

* * * * *